United States Patent Office 3,292,698
Patented Dec. 20, 1966

3,292,698
TREATING PERMEABLE FORMATIONS WITH AQUEOUS POSITIVE NONSIMPLE FLOODING LIQUIDS
Joseph G. Savins, Dallas, Tex., assignor to Mobil Oil Corporation, a corporation of New York
No Drawing. Filed June 26, 1964, Ser. No. 378,442
16 Claims. (Cl. 166—9)

This invention relates to flow of an aqueous liquid in a permeable earth formation. Particularly, this invention pertains to a method of treating subterranean formations by flowing into the formations an aqueous flooding liquid. More particularly, this invention is directed to improving the recovery of oil from a subterranean formation by flowing therethrough an aqueous solution.

The oil accumulated in subterranean formations is recovered or produced therefrom through wells drilled into the subterranean formations. A large amount of the oil is left in a subterranean formation if produced only by primary depletion, i.e., by employing only initial formation energy to recover the oil. Supplemental operations, often referred to as secondary recovery operations, are used to improve the extent of recovery. In certain of these supplemental recovery operations, a fluid is injected through at least one well, called an injection well, and passed into the formation. Oil is displaced from and is moved through the formation and is produced from another well, called a production well, or wells, as the injected fluid passes from the injection well toward the production wells. In a particular recovery operation of this sort, water is employed as the injected fluid and the operation is often referred to as a waterflood and the water is often referred to as the flooding liquid.

Two major types of sweep efficiency, i.e., macroscopic, or areal, sweep efficiency and microscopic sweep efficiency, influence the effectiveness of the passage of the injected fluid through the formation.

The first type, the macroscopic sweep efficiency, is most seriously affected by permeability stratification of the subterranean formation and by the difference between the viscosity of the in-situ oil and the injected fluid. In any operation in which a fluid is injected through an injection well into a subterranean formation, permeability stratification is significant, and it is most significant in secondary recovery operations. By causing a disproportionately large amount of the injected fluid to enter the more permeable zones, this stratification results in premature production of the injected fluid at the production wells. The premature production is referred to as premature breakthrough and manifests itself as an increasing ratio of the injected fluid to the oil in the produced fluids. Thus, premature breakthrough can render an otherwise well-engineered recovery project relatively uneconomical because of the cost of treating and recycling of injected fluid.

Where the viscosity of the injected fluid is markedly less than the viscosity of the in-situ oil, a situation referred to as instability is created. In this situation, the less viscous injected fluid tends to develop fingers or bulges which may be caused by points of minute inhomogeneity in the formation. These fingers grow and travel at a much faster rate than the remainder of the injected fluid, and thus also cause premature breakthrough.

Various means have been proposed to improve macroscopic sweep efficiency and thereby avoid premature breakthrough. Selective plugging operations have been taught to correct permeability stratification. Viscosity gradation, wherein a liquid or liquids having a viscosity between that of the injected fluid and that of the in-situ oil is injected into the formation prior to the injected fluid, is taught to cure or minimize instability fingering. One method which has been taught to correct both the permeability stratification and the instability fingering involves the use of a thickener in the leading edge of an injected fluid. More specifically, it has been taught to add thickeners to the leading edge of a waterflood.

The second type of sweep efficiency, the microscopic sweep efficiency, is influenced by the interfacial tension and the contact angle between the injected fluid and the in-situ oil, and by the permeability of the formation. The greater the interfacial tension, the more resistance the injected fluid will encounter in attempting to displace the oil in the more restricted interstices of the formation. To achieve improved microscopic sweep efficiency, it has been taught to add a surfactant to an injected fluid to decrease the interfacial tension and to alter the contact angle. Available methods of altering permeability, such as fracturing or acidizing, are of limited benefit in improving microscopic sweep efficiency since they do not affect to any great extent the overall permeability of the formation but rather create only localized flow channels of high permeability.

Despite experimental and field use of the foregoing additives and methods to improve sweep efficiency, much oil continues to remain in a subterranean formation after the best supplementary recovery operations heretofore known have been employed.

Therefore, it is an object of this invention to provide a method for treating a subterranean formation.

It is also an object of this invention to provide a method for evening out injection and flow profiles in a subterranean formation, thus benefiting the distribution pattern of any other fluids injected concurrently, alternately, or subsequently.

It is another object of the invention to provide a method of recovering oil by passing through a formation flooding water which will increase both the macroscopic and microscopic sweep efficiencies of the flooding operation.

It is another object of the invention to provide a method of decreasing the flow of flooding water in more permeable domains relative to flow in less permeable domains of a subterranean formation.

In accordance with the invention, in the treatment of a permeable subterranean formation, there is passed into the formation from an injection well water having incorporated therein quantities sufficient to provide a solution which is viscoelastic and which is also a shear hardening, positive nonsimple liquid of an additive system comprising (1) undecane-3-sodium sulfate and cyclohexylammonium chloride, or (2) sodium elaidate, sodium chloride, and sufficient caustic to provide in the solution a pH between about 9.5 and about 12. In a specific aspect of the invention, in the recovery of oil from a subterranean formation by injecting a flooding liquid through an injection well and into the formation, and producing oil from the formation through a production well, there is employed, as the flooding liquid, water incorporating one of the above additive systems in a quantity sufficient to provide a viscoelastic solution which is also a shear hardening, positive nonsimple liquid. The solutions containing the additive systems will be hereinafter termed "the active solutions." The reasons why the solutions are so termed will later become apparent.

A viscoelastic liquid is a liquid which possesses both elastic and viscous properties. Viscoelastic liquids have a characteristic viscosity function, which function may or may not be dependent on rate of shear or stress. They also exhibit elasticity of shape and a retarded elastic recovery in deformation. A viscoelastic liquid may be a solution comprising one or more solvents containing one or more solutes.

In laminar flow of a viscoelastic liquid, components of stress which are normal as well as tangential to the direction of the stress frequently develop and secondary flow effects appear. Thus, the normal stresses in a viscoelastic liquid flowing in a circular conduit cause an appreciable axial tension to develop. When the flowing liquid emerges from a circular conduit, the tension in the streamlines relaxes with the result that the liquid stream swells to a diameter in excess of the diameter of the conduit. Accordingly, the liquid leaving the conduit expands or bulges outwardly, forming what might be termed an enlarged bulb at the opening of the conduit.

Another characteristic of a viscoelastic liquid is its flow behavior between rotating concentric cylinders. Analysis of the complete spatial distribution of stress for a viscoelastic liquid in this situation shows that the primary phenomenon is the appearance of an additional tension along the streamlines. Between the rotating concentric cylinders, the streamlines are circles and the tension becomes a hoop or strangulation stress which constricts the liquid toward the axis of rotation. As a consequence, the liquid tends to climb the rotating cylinder and a pronounced thrust develops.

Further with respect to the characteristics of a viscoelastic liquid, it can be shown by theoretical analysis that flow in rectilinear paths through conduits of arbitrary cross section under a constant pressure gradient is not always possible for certain of these liquids. Thus, if the flow conduit is noncylindrical, superimposed onto the simple rectilinear motion is a steady motion in which liquid particles follow spiral paths to develop a vortexlike motion.

Each of the properties of a viscoelastic liquid described above is of value in displacing oil from a subterranean formation. Flow of the liquid through the interstices of a subterranean formation will ordinarily be laminar. Thus, with the development of axial tension of the viscoelastic liquid upon flow from restraining portions of substantially circular interstices, or conduits, within the formation, the resulting bulging effect enables the viscoelastic liquid to displace the oil from adjacent wider portions of the interstices. The development of tension along the streamlines of flow of the viscoelastic liquid and the development of thrust by the liquid will additionally effect displacement of the oil otherwise trapped within the interstices of the formation. Furthermore, the development of vortexlike motion in the flow of the viscoelastic liquid in noncircular interstices effects a thorough displacing action by the viscoelastic liquid of the oil in the interstices.

As the name implies, a shear hardening liquid is a liquid which hardens, i.e., develops a high viscosity, when subjected to certain rates of shear. The property of shear hardening thus enables such a liquid to develop a higher viscosity when subjected to a higher rate of shear in a subterranean formation. Such a higher rate of shear is induced in a liquid when it flows in a more permeable stratum than when it flows in parallel, i.e., under the influence of the same pressure drop, in a less permeable stratum within a subterranean formation. A shear hardening liquid thus is active in that it becomes selectively more viscous in the more permeable strata than in the less permeable strata. As a result, the rates of flow of the liquid in the more permeable and in the less permeable strata become more nearly equalized and premature breakthrough is lessened.

A positive nonsimple liquid is a liquid which has a higher viscosity when it flows in a more permeable stratum than when it flows at the same nominal rate of shear in a less permeable stratum. A positive nonsimple liquid thus is active in the sense that it adjusts its properties to flow at a rate which is relatively insensitive to the permeability of the various strata within a subterranean formation through which it is flowing. This phenomenon differs from that of shear hardening in that the positive nonsimple liquid increases in viscosity in the more permeable strata through which it is flowing even at equal rates of shear. Permeability controls whether a flowing positive nonsimple liquid becomes more viscous or not, whereas shear rate controls whether a flowing shear hardening liquid becomes more viscous or not. Both phenomena operate to achieve more nearly uniform injection and flow profiles of a positive nonsimple, shear hardening liquid passing through a subterranean formation.

The active solutions employed in the method of the invention exhibit the properties of shear hardening, positive nonsimplicity, and viscoelasticity. Through the properties of shear hardening and positive nonsimplicity, they improve the macroscopic sweep efficiency and thus enable the recovery of a greater portion of the oil from a subterranean formation before they break through at a production well. Since the active solutions are also viscoelastic, they improve the microscopic flooding efficiency as they pass through the subterranean formation.

Whether a particular liquid exhibits the properties of shear hardening, viscoelasticity, or positive nonsimplicity can be determined from its behavior in a rotational viscometer, such as a Couette-type viscometer. The viscosity of the liquid, measured as a function of the rate of shear on such a rotational viscometer at different gap sizes, indicates the existence of each of the properties. The gap size in such a viscometer is the distance separating the concentric cylinder walls immersed in the liquid whose viscosity is being measured. The curve which results from plotting the data obtained on the viscometer, e.g., plotting the viscosity as the ordinate against the shear rate as the abscissa, depicts the properties of shear hardening, viscoeleasticity, or positive nonsimplicity. With a solution, if the curve representing the viscosity of the solution increases with increasing shear rates within a certain range of shear rates, the solution is a shear hardening liquid. If a liquid exhibits the previously described properties, e.g., (1) upon emergence from a conduit swelling to a diameter in excess of the diameter of the conduit, or (2) climbing a cylinder rotating therein, it is viscoelastic. Further tests for determining whether a liquid is viscoelastic or not may be found in a number of books discussing the phenomena, e.g., "Viscoelastic Properties of Polymers," J. D. Ferry, Wiley Publishing Co., New York, 1961. If the curve representing the viscosity of the solution is higher than that of the solvent at certain shear rates using a particular gap size on the viscometer and is higher still at the same shear rates using a larger gap size, the solution is a positive nonsimple liquid. Further, with solutions exhibiting the properties of shear hardening, viscoelasticity and positive nonsimplicity, the relative quantitative activity of the solution may be measured by the area between the curve representing the viscosity response of the solvent and the curve representing the viscosity response of the solution at an arbitrarily chosen gap size. One useful gap size is 0.123 centimeter between concentric cylinders having radii of 1.257 and 1.380 on a U.L. adapter of a Brookfield Model LVT Synchro-Lectric Viscometer having variable rate of rotation.

The properties of shear hardening, viscoelasticity and positive nonsimplicity also can be determined by flowing a liquid through models or core samples of subterranean formations. Such models may be connected in parallel to simulate strata of differing permeabilities in a subterranean formation. Such determinations carried out in the models or core samples are time consuming and the use of a rotational viscometer is preferred to delineate liquids having the properties of shear hardening, viscoelasticity, and positive nonsimplicity.

In the practice of the invention, the additive system is incorporated into water to form the active solution. By water is meant any flooding liquid commonly used in waterfloods for recovery of oil from a subterranean formation. Such liquids include oil field brines and commonly available dilute aqueous solutions such as surface water. Where brines are employed, they may contain up to 3.5 percent by weight of sodium chloride. However, brines containing greater amounts of sodium chloride are desirably not employed since concentrations of sodium chloride greater than about 3.5 percent by weight tend to destroy the activity of the active solutions. Such liquids also include other well waters, rain water, and city water.

In one embodiment of the invention, the water has incorporated therein from 0.05 to 1 percent by weight of undecane-3-sodium sulfate and at least 0.5 percent by weight of cyclohexylammonium chloride. The resulting aqueous solution is approximately neutral, i.e., it has a pH between about 6 and about 8 and is an active solution.

In another embodiment of the invention, the water has incorporated therein from 0.05 to 1 percent by weight of sodium elaidate and from 0.5 to about 3.5 percent by weight of sodium chloride, and sufficient caustic that the solution has a pH between about 9.5 and about 12. Part or all of the required sodium chloride may be provided by brine where it is used to prepare the active solution. Preferably, sufficient caustic is employed to impart a pH of approximately 10.5 to the solution.

By caustic is meant the alkali metal hydroxides or carbonates. Preferably, sodium hydroxide or sodium carbonate is employed. Sodium carbonate is particularly useful because it tends to provide a buffered pH in the desired range even when used in excess of the required amount. The amount of caustic required depends primarily upon the pH of the water used to prepare the active solution and to a lesser extent upon the quantity of the alkaline sodium elaidate incorporated into the water.

The above-described solutions may be employed and will remain active in the temperature range of most subterranean formations wherein flooding operations are carried out. The higher concentrations in the range set out above are employed in deeper formations having higher temperatures. Even higher concentrations may be used to extend the activity of the solutions at still more elevated temperatures, e.g., greater than 40° C.

The particular additive system employed may be incorporated in only a portion of the flooding water to create a slug or slugs of active solution. The slug should have a volume of from 0.1 to 30 percent, preferably 1 to 10 percent, of the pore volume of the formation. The slug of active solution is injected through the injection well and passed into the formation. The slug may be driven into the formation by injecting behind it a driving fluid such as water or natural gas. Such a slug may be injected only once or may be injected alternately with at least equal volumes of driving fluid, e.g. preferably untreated water, between alternate slugs of active solution to achieve the desired recovery of oil from the subterranean formation. Instead of untreated water, water having lower concentrations of additives and hence less activity as a shear hardening, positive nonsimple liquid, may be used between alternate slugs of active solution. Each slug of active solution tends to even out the flow, to alter the pressure gradients, and more nearly to compensate for permeability stratification in the formation. Hence, the greater the number of treated slugs, the more effective will be the flood. This is, of course, more expensive and the particular formation will dictate the economics of the amount and frequency of the slugs which are to be injected, ranging from only one slug to treating all of the flooding water.

It is possible to precipitate a divalent salt, such as calcium elaidate or undecane-3-calcium sulfate, if the active solutions of the invention come in contact with formation liquids containing certain divalent ions, such as calcium. It is preferred to take steps to prevent such precipitation.

One way to prevent such precipitation is to inject a slug of from 0.01 to 1.0 percent of a pore volume of water in advance of the active solution. The water will build up a bank and miscibly displace the aqueous formation liquids, containing the divalent ions, thus preventing contact of the active solution with the aqueous formation liquids.

Another way to prevent such precipitation is to incorporate into the active solution a chelating or sequestering agent, such as tetrasodium salt of ethylenediaminetetraacetic acid, sold commercially as sodium Versenate, or sodium phosphate glass, commonly called sodium hexametaphosphate, and sold commercially as Calgon. The amount of chelating agent should be at least 0.1 percent by weight. Where sodium chloride is present, or may become present in a concentration as great as 3.5 percent by weight, the concentration of chelating agent should not exceed 1.5 percent by weight. On the other hand, where less sodium chloride is present, greater amounts of chelating agent may be employed. Alternatively, a slug of from 0.01 to 1.0 percent of a pore volume of an aqueous solution of the chelating or sequestering agent may be injected into the formation ahead of the positive nonsimple liquid.

If desired, both ways may be combined. Thus a slug of water may be injected into the injection well and passed into the formation, followed by the chelating agent, followed by the active solution.

Having thus described by invention, it will be understood that such description has been given by way of illustration and example and not by way of limitation, reference for the latter purpose being had to the appended claims.

What is claimed is:

1. In a method of treating a subterranean formation, the step comprising passing into said formation water having incorporated therein quantities sufficient to provide a solution which is viscoelastic and is also a shear hardening, positive nonsimple liquid of an additive system selected from the class consisting of (1) undecane-3-sodium sulfate and cyclohexylammonium chloride, and (2) sodium elaidate, sodium chloride and caustic.

2. In a method of treating a subterranean formation comprising passing into said formation at least one fluid, the step comprising passing into said formation water having incorporated therein quantities sufficient to provide a solution which is viscoelastic and is also a shear hardening, positive nonsimple liquid of an additive system selected from the class consisting of (1) undecane-3-sodium sulfate and cyclohexylammonium chloride, and (2) sodium elaidate, sodium chloride and caustic.

3. In a method for the recovery of oil from a subterranean formation by injecting at least one fluid through an injection well and into said formation and producing oil from said formation through a production well, the improvement comprising passing into said formation water having incorporated therein quantities sufficient to provide a solution which is viscoelastic and is also a shear hardening, positive nonsimple liquid of an additive system selected from the class consisting of (1) undecane-3-sodium sulfate and cyclohexylammonium chloride, and (2) sodium elaidate, sodium chloride and sufficient caustic to provide a pH in said solution of between about 9.5 and about 12.

4. The method of claim 3 wherein said additive system incorporated in said solution is undecane-3-sodium sulfate and cyclohexylammonium chloride in approximately neutral solution.

5. The method of claim 4 wherein said undecane-3-sodium sulfate is in a concentration of from 0.05 to 1 percent by weight of said solution and said cyclohexylammonium chloride is in a concentration greater than 0.5 percent by weight of said solution.

6. The method of claim 4 wherein said approximately neutral solution has a pH between about 6 and about 8.

7. The method of claim 3 wherein said additive system incorporated in said solution is sodium elaidate, sodium chloride and sufficient caustic to provide a pH in said solution of between about 9.5 and about 12.

8. The method of claim 7 wherein said sodium elaidate is in a concentration of from 0.05 to 1 percent by weight of said solution and said sodium chloride is in a concentration of from 0.5 to 3.5 percent by weight of said solution.

9. The method of claim 7 wherein said pH in said solution of between about 9.5 and about 12 is a pH of about 10.5.

10. The method of claim 9 wherein said pH of about 10.5 is provided and buffered by incorporating in said solution sodium carbonate.

11. In a method for the recovery of oil from a subterranean formation by injecting a flooding liquid through an injection well and into said formation, and producing oil from said formation through a production well, the improvement comprising the steps of injecting a slug of active solution comprising water and sufficient quantity of an additive system to create a viscoelastic, shear hardening, positive nonsimple liquid, said additive system being selected from the class consisting of (1) undecane-3-sodium sulfate and cyclohexylammonium chloride, and (2) sodium elaidate, sodium chloride and sufficient caustic to provide a pH in said active solution of between about 9.5 and about 12, said slug of active solution having a volume of about 0.1 to 30 percent of the pore volume of said formation, and thereafter injecting a driving fluid through said injection well into said formation whereby said oil in said formation is displaced by said active solution which is in turn displaced by said driving fluid.

12. The method of claim 11 wherein said slug of said active solution has a volume of about 1 to about 10 percent of the pore volume of said formation.

13. The method of claim 11 wherein said driving fluid is water.

14. The method of claim 11 wherein said driving fluid is a hydrocarbon gas.

15. The method of claim 11 wherein said slug of said active solution is injected alternately with slugs of at least equal volume of said driving fluid.

16. A method of recovering oil from an oil-containing subterranean formation having completed therein an injection means comprising at least one injection well and a production means comprising at least one production well, comprising the steps of:
  (a) injecting through said injection means a slug of from 0.01 to 1 percent pore volume of water,
  (b) injecting through said injection means a slug of from 0.01 to 1 percent pore volume of an aqueous solution containing from 0.1 to 1.5 percent by weight of a chelating agent selected from the class consisting of tetrasodium ethylenediaminetetraacetic acid and sodium hexametaphosphate,
  (c) injecting through said injection means a slug of 1 to 10 percent pore volume of an active solution comprising water having incorporated therein an additive system in an amount sufficient to create a viscoelastic, shear hardening, positive nonsimple liquid, said additive system being selected from the class consisting of (1) undecane-3-sodium sulfate and cyclohexylammonium chloride, and (2) sodium elaidate, sodium chloride and sufficient caustic to provide a pH in said active solution of between about 9.5 and about 12,
  (d) injecting through said injection means water to drive the foregoing liquids toward said production means, and
  (e) simultaneously producing the oil displaced from within said formation through said production means.

References Cited by the Examiner
UNITED STATES PATENTS

| | | | |
|---|---|---|---|
| 2,670,048 | 2/1954 | Menaul | 166—42 X |
| 2,771,138 | 11/1956 | Beeson | 166—9 |
| 2,965,172 | 12/1960 | Da Roza | 166—42 |
| 3,198,252 | 8/1965 | Walker et al. | 166—32 |

JACOB L. NACKENOFF, *Primary Examiner.*

S. J. NOVOSAD, *Assistant Examiner.*